Jan. 19, 1960 M. C. KIDD 2,921,981

SIMPLIFIED TWO-CHANNEL MULTIPLEX SYSTEM

Filed April 26, 1954

INVENTOR.
MARSHALL C. KIDD
BY Charles H. Brown
ATTORNEY

United States Patent Office 2,921,981

Patented Jan. 19, 1960

2,921,981

SIMPLIFIED TWO-CHANNEL MULTIPLEX SYSTEM

Marshall C. Kidd, Haddon Heights, N.J., assignor to Radio Corporation of America, a corporation of Delaware Application April 26, 1954, Serial No. 425,455

9 Claims. (Cl. 179—15)

This invention relates to a two-channel multiplex system of communications, and more particularly to a simplified inexpensive system employing a minimum number of circuit components.

The system of this invention is useful, for example, in the binaural transmission of sound. With the binaural system, two channels are employed to give the listener a sense of the position from which the sound emanates. The invention is also useful as a two-channel communication system, as a two-channel telemetering system, and as a two-channel system for control circuits and other uses.

Many multiplex systems are known in the art. It is an object of this invention to provide a highly simplified two-channel multiplex system for use in applications where the economic factor is of great importance.

In one aspect, the invention comprises at the transmitting terminal, two diodes so arranged with respect to an oscillator that the positive half cycles from the oscillator are developed across one of the diodes which is poled to short circuit the negative half cycles, and the negative half cycles are developed across the other diode which is poled to short circuit the positive half cycles. A first audio signal is also applied across one of the diodes, and a second audio signal is applied across the other of the diodes. An output is taken from the center of a resistor connected across both of the diodes. The output is in the nature of a carrier wave amplitude modulated on the upper side with one of the audio signals, and amplitude modulated on the bottom side by the other of the audio signals. At the receiving terminal, the signal from the transmitting terminal is applied to two diodes so arranged that one detects the modulation on the upper side of the carrier wave, and the other detects the modulation on the bottom side of the carrier wave. Output resistors across the respective diodes provide the separate audio signals.

For a more complete description of the invention, reference is made to the following detailed description taken in conjunction with the appended drawings, wherein.

Figure 1:
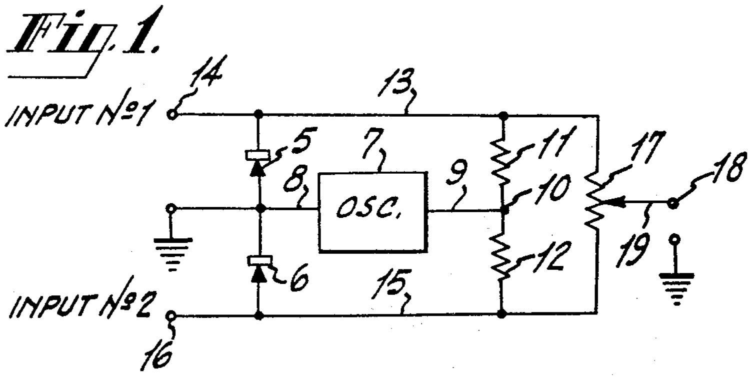
Figure 1 is a circuit diagram of a transmitting terminal constructed according to the teachings of this invention.

Figure 1 shows a transmitting terminal of a two-channel multiplex system. A diode 5 has its anode connected to ground, and a diode 6 has its cathode connected to ground. The symbol used in the drawings to represent a diode includes an arrowhead pointing in the direction offering the least resistance to conventional current flow as contrasted with electron flow. An oscillator 7 has an output lead 8 connected to ground, and an output lead 9 connected to the junction point 10 between isolating resistors 11 and 12. The other end of resistor 11 is connected by lead 13 to the cathode of diode 5 and a first message signal input terminal 14. The other end of resistor 12 is connected thru lead 15 to the anode of diode 6 and to the second message signal input terminal 16. An output resistor 17 is connected between leads 13 and 15, and an output terminal 18 is connected by contact arm 19 to an intermediate point on output resistor 17.

Figure 3:
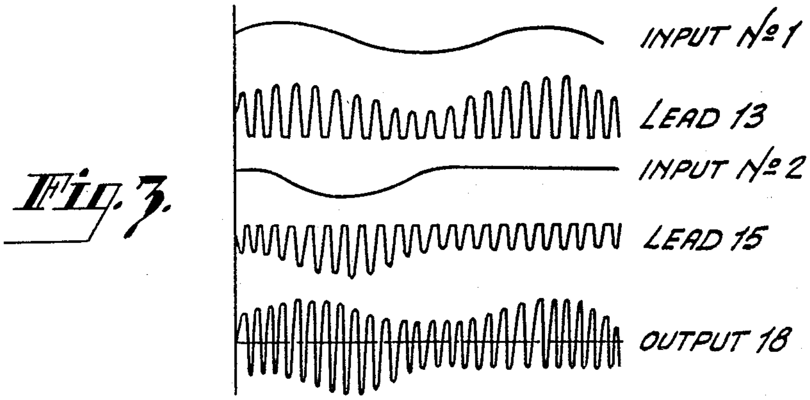
Figure 3 is a chart of waveforms appearing at identified points in the circuit of Figure 1.

In the operation of the transmitting terminal unit of Figure 1, the oscillator 7 provides a carrier wave which may have a frequency of 20 kilocycles. The output of oscillator 7 is connected thru leads 8, 9, 13 and resistor 11 across the diode 5; and also thru leads 8, 9, 15 and resistor 12 across diode 6. It will be noted that the diodes 5 and 6 are poled so that the positive half cycles in the output of the oscillator 7 exist across the diode 5, while the negative half cycles are short circuited, and the negative half cycles from the oscillator 7 exist across the diode 6, while the positive half cycles are short circuited. A first message signal (Input No. 1 of Figure 3) applied to input terminal 14 causes an amplitude modulation of the positive half cycles from the oscillator 7 in the diode 5 to provide a waveform on lead 13 as shown in Figure 3. A second message signal (Input No. 2 of Figure 3) applied to input terminal 16 causes amplitude modulation of the negative half cycles from the oscillator 7 in the diode 6 to provide a waveform on lead 15 as shown in Figure 3. The amplitude modulated positive half cycles, and the amplitude modulated negative half cycles are combined in the output resistor 17 which is connected across both of the diodes 5 and 6. The output obtained at output terminal 18, as shown in Figure 3, is a 20 kilocycle carrier wave having its positive half cycles modulated by the message signal applied to input terminal 14, and having its negative half cycles amplitude modulated by the message signal applied to input terminal 16.

Figure 2:
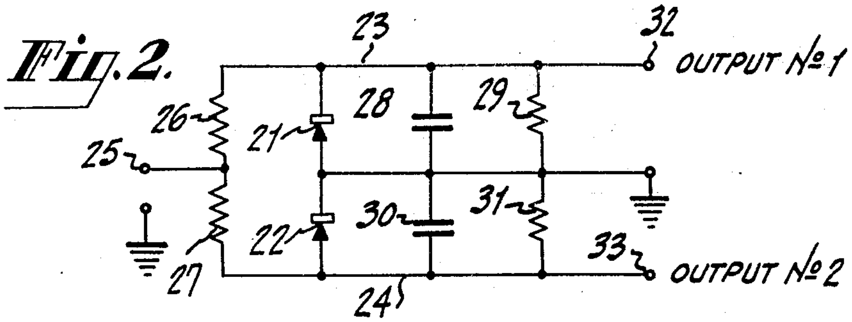
Figure 2 is a circuit diagram of a receiving terminal unit according to this invention.

Figure 2 shows the receiving terminal of the multiplex system. A diode 21 has its anode connected to ground, and a diode 22 has its cathode connected to ground. The cathode of diode 21 is connected to a bus 23, and the anode to diode 22 is connected to a bus 24. A signal input terminal 25 is connected thru resistor 26 to the bus 23, and is connected thru resistor 27 to the bus 24. By-pass capacitor 28 and output resistor 29 are connected from bus 23 to ground. By-pass capacitor 30 and output resistor 31 are connected from bus 24 to ground. Bus 23 is connected to ouput terminal 32, and bus 24 is connected to output terminal 33.

In the operation of the receiving terminal of Figure 2, the message modulated 20 kilocycle signal from the output terminal 18 of the transmitting unit of Figure 1 is applied to the input terminal 25 of the receiving terminal of Figure 2, thru the medium of a transmission line or a radio link (not shown). If a radio link is employed, the message modulated 20 kilocycle signal is used to modulate a radio frequency carrier which is demodulated at the receiving terminal. During the positive half cycles of the signal applied to input terminal 25, current flows thru resistor 26 and output resistor 29 to provide an output at output terminal 32, and current flows thru resistor 27 and diode 22 to ground so there is no output on terminal 33. During the negative half cycles of the input signal, current flows thru resistor 27 and output resistor 31 to provide an output at output terminal 33, and current flows thru resistor 26 and diode 21 so there is no output on terminal 32. The diode 21 detects the message signal modulation on the upper or positive part of the input wave and develops an output message signal across output resistor 29 which is available at output terminal 32. The diode 22 detects the message signal modulation on the lower or negative part of the output signal wave and develops a message signal output across output resistor 31 which is available at output terminal 33. Capacitors 28 and 30 by-pass the carrier frequency, which in the present example is 20 kilocycles. It is thus apparent that the message signal applied to input terminal 14 of Figure 1 appears at output terminal 32 of Figure 2, and the message signal applied to input terminal 16 of Figure 1 appears at the output terminal 33 of Figure 2.

Merely to illustrate the values of circuit components which may be used with a carrier frequency of 20 kilocycles for the multiplexing of two audio message signals, resistors 11, 12, 26 and 27 may have a value of 100,000 ohms, resistor 17 may have a value of 10,000 ohms, and resistors 29 and 31 may have a value of 5,000 ohms. Diodes 5, 6, 21 and 22 may be crystal diodes. By-pass capacitors 28 and 30 may have a value of 0.001 microfarad.

In the operation of the two-channel multiplex system according to this invention, it is important that the percentage modulation be kept at a relatively low value, and not be allowed to approach 100%. The percentage modulation should preferably not exceed 25%. In the transmitting unit of Figure 1, the resistor 17 is preferably constructed in the form of a potentiometer to permit a balancing adjustment by means of contact arm 19 so that the two waveforms are mixed equally. This adjustment is made in the absence of input signals to provide equal positive and negative outputs from the oscillator 7 at the output terminal 18. Resistors 11 and 12 serve as isolating resistors to provide twenty-five to thirty db of isolation between the two channels.

The multiplex system of this invention is considered to be a hybrid system having characteristics of both a time division pulse multiplex system and a carrier modulation and demodulation system. The diodes act as switches to alternately render the two signal channels operative. The system is advantageous by comparison with a pulse multiplex system in that the communications link between the transmitting and receiving terminal is not required to handle high harmonic frequency components. If the percentage modulation is kept at a low value, the communications link merely needs to handle frequencies up to the frequency of the oscillator 7.

According to this invention there is provided a two-channel multiplex system wherein the transmitting and receiving terminals are reduced to the ultimate in simplicity, and by means of which two message signals may be multiplexed over a common transmission link with good quality characteristics.

What is claimed is:

1. A two-channel multiplex system comprising; a transmitting terminal including; an oscillator, two diodes connected in series, means including a first isolating resistor for connecting the output of said oscillator across said first diode, means including a second isolating resistor for connecting the output of said oscillator across said second diode, said diodes being poled so that one diode is conductive during the positive half cycles of said oscillator, and the other is conductive during the negative half cycles of said oscillator, means to apply first and second message signals respectively across said first and second diodes, an output resistor connected across both of said series connected diodes, output terminals across a center tap on said output resistor and the junction between said diodes; and a receiving terminal including; input terminals linked with said output terminals of said transmitting terminal, a third diode and a resistor connected in series across said input terminals, a fourth diode and resistor connected in series across said input terminals, said third and fourth diodes being oppositely poled with reference to said input terminals, a by-pass capacitor and an output resistor connected across each of said third and fourth diodes, and means to derive said first and second message signals from across said respective last-mentioned output resistors.

2. A transmitting terminal of a two-channel multiplex system comprising, an oscillator, two diodes connected in series, means including a first isolating resistor foı connecting the output of said oscillator across said first diode, means including a second isolating resistor for connecting the output of said oscillator across said second diode, said diodes being poled so that one diode is conductive during the positive half cycles from said oscillator, and the other is conductive during the negative half cycles from said oscillator, means to apply first and second message signals respectively across said first and second diodes, an output resistor connected across both of said series connected diodes, an output terminals across a center tap on said output resistor and a junction between said diodes.

3. A receiving terminal of a two-channel multiplex system comprising, input terminals to which a two-channel multiplex signal is applied, a first diode and a first impedance connected in series across said input terminals, a second diode and a second impedance connected in series across said input terminals, said diodes being oppositely poled with reference to said input terminals, a by-pass capacitor and an output impedance connected across each of said diodes, and means to derive separate message signals from across said output impedances.

4. A receiving terminal of two channel multiplex system comprising, input terminals to which a two-channel multiplex signal is applied, a first diode and a first resistor connected in series across said input terminals, a second diode and a second resistor connected in series across said input terminals, said diodes being oppositely poled with reference to said input terminals, a by-pass capacitor and an output resistor connected across each of said diodes, and means to derive separate message signals from across said output resistors.

5. A two-channel multiplex system comprising a transmitting terminal including an oscillator, first and second diodes connected in series, means including a first isolating resistor connecting the output of said oscillator across said first diode, means including a second isolating resistor connecting the output of said oscillator across said second diode, said first diode being poled so that it is conductive during the positive half cycles of said oscillator and said second diode being poled so that it is conductive during the negative half cycles of said oscillator, means to apply a first message signal across said first diode, means to apply a second message signal different from said first message signal across said second diode, an output resistor connected across both of said series connected diodes, output terminals across a center tap on said output resistor and the junction between said first and second diodes; and a receiving terminal including input terminals linked with said output terminals of said transmitting terminal, a third diode and a resistor connected in series across said input terminals, a fourth diode and a resistor connected in series across said input terminals, said third and fourth diodes being oppositely poled with reference to said input terminals, a by-pass capacitor and a second output resistor connected in parallel and across said third diode, a by-pass capacitor and a third output resistor connected in parallel and across said fourth diode, and means to derive said first and second message signals from across said respective second and third output resistors.

6. A transmitting terminal of a two-channel multiplex system comprising, first and second input terminals to which message signals can be applied, a first diode connected between said first input terminal and a point of reference potential, a second diode connected between said second input terminal and said point of reference potential, an oscillator, means including a first resistance for connecting the output of said oscillator across said first diode, means including a second resistance for connecting the output of said oscillator across said second diode, said diodes being poled so that one diode is conductive during the positive half cycles from said oscillator and the other is conductive during the negative half cycles from said oscillator, an output resistor connected across both of said diodes, and output terminals across a tap on said output resistor and said point of reference potential.

7. A transmitting terminal as claimed in claim 6 and wherein said first and second resistances are connected in series between said first and second input terminals, said oscillator being connected between the junction of said first and second resistances and said point of reference potential.

8. A receiving terminal of a two-channel multiplex system comprising, first and second input terminals to which a two-channel multiplex signal amplitude modulated on the upper side with one message signal and amplitude modulated on the bottom side with a second message signal can be applied, first and second resistors, first and second diodes each having cathode and anode electrodes, means to connect the cathode of said first diode through said first resistor to said first terminal and the anode of said first diode to said second terminal, means to connect the anode of said second diode through said second resistor to said first terminal and the cathode of said second diode to said second terminal, whereby said diodes are oppositely poled with reference to said input terminals, a capacitor and an output resistor connected across said first diode, a second capacitor and a second output resistor connected across said second diode, and means to derive separate message signals from across said output resistors.

9. A receiving terminal of a two-channel multiplex system comprising, input terminals to which a two-channel multiplex signal is applied, a first diode and a first impedance connected in series across said input terminals, a second diode and a second impedance connected in series across said input terminals, said diodes being oppositely poled with reference to said input terminal, a capacitor and an output impedance connected in parallel and across said first diode, a capacitor and an output impedance connected in parallel and across said second diode, and means to derive separate message signals from across said output impedances.

References Cited in the file of this patent

UNITED STATES PATENTS

| | | |
|---|---|---|
| 1,906,269 | Hough | May 2, 1933 |
| 2,262,764 | Hull | Nov. 18, 1941 |
| 2,344,633 | Pfleger | Mar. 21, 1944 |
| 2,352,634 | Hull | July 4, 1944 |
| 2,424,961 | Bancroft et al. | Aug. 5, 1947 |
| 2,607,035 | Levine | Aug. 12, 1952 |
| 2,683,770 | Kalfaian | July 13, 1954 |
| 2,706,811 | Steele | Apr. 19, 1955 |
| 2,773,982 | Trousdale | Dec. 11, 1956 |

FOREIGN PATENTS

| | | |
|---|---|---|
| 552,807 | Great Britain | Apr. 27, 1943 |

UNITED STATES PATENT OFFICE

CERTIFICATE OF CORRECTION

Patent No. 2,921,981 January 19, 1960

Marshall C. Kidd

It is hereby certified that error appears in the printed specification of the above numbered patent requiring correction and that the said Letters Patent should read as corrected below.

Column 2, line 41, for "to diode 22" read -- of diode 22 --; line 47, for "ouput" read -- output --; column 4, line 13, for "an" read -- and --.

Signed and sealed this 2nd day of August 1960.

(SEAL)
Attest:

KARL H. AXLINE
Attesting Officer

ROBERT C. WATSON
Commissioner of Patents